(12) United States Patent
Barhorst et al.

(10) Patent No.: US 9,517,523 B2
(45) Date of Patent: Dec. 13, 2016

(54) SYSTEM AND METHOD OF REDUCING DIFFUSIBLE HYDROGEN IN WELD METAL

(75) Inventors: Steven Barhorst, Sidney, OH (US); Mario Amata, Dublin, OH (US); Joseph C. Bundy, Piqua, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 648 days.

(21) Appl. No.: 13/079,521

(22) Filed: Apr. 4, 2011

(65) Prior Publication Data

US 2011/0248000 A1    Oct. 13, 2011

Related U.S. Application Data

(60) Provisional application No. 61/322,604, filed on Apr. 9, 2010.

(51) Int. Cl.
   *B23K 35/38*   (2006.01)
   *B23K 9/16*    (2006.01)
   *B23K 9/10*    (2006.01)
   *B23K 9/173*   (2006.01)

(52) U.S. Cl.
   CPC ............ *B23K 9/164* (2013.01); *B23K 9/1043* (2013.01); *B23K 9/173* (2013.01); *B23K 35/38* (2013.01)

(58) Field of Classification Search
   USPC ........................................ 219/74, 75, 145.22
   See application file for complete search history.

(56) References Cited

U.S. PATENT DOCUMENTS

| | | |
|---|---|---|
| 589,934 A | 9/1897 | Clarke |
| 2,805,323 A | 9/1957 | Cushman |
| 2,864,934 A | 12/1958 | Bernard |
| 2,948,803 A | 8/1960 | Wilson |
| 2,965,524 A | 12/1960 | Claussen |
| 3,071,852 A | 1/1963 | Rogers |
| 3,283,121 A | 11/1966 | Bernard |
| 3,329,798 A | 7/1967 | Johnson |
| 3,626,138 A | 12/1971 | Hurley |
| 3,692,971 A | 9/1972 | Kniepkamp |
| 3,746,500 A | 7/1973 | Hughey |
| 3,752,951 A | 8/1973 | Kniepkamp |

(Continued)

FOREIGN PATENT DOCUMENTS

| | | |
|---|---|---|
| CN | 1069437 | 3/1993 |
| CN | 2623398 | 7/2004 |

(Continued)

OTHER PUBLICATIONS

International Search Report for application No. PCT/US2011/031278 mailed Jul. 1, 2011.

(Continued)

*Primary Examiner* — Dana Ross
*Assistant Examiner* — Ayub Maye
(74) *Attorney, Agent, or Firm* — Fletcher Yoder P.C.

(57) ABSTRACT

This disclosure relates generally to arc welding. In an embodiment, a welding system has a welding gas supply system configured to supply a gas flow including a shielding gas and a fluorine-containing gas to a weld pool. Furthermore, the shielding gas is configured to control an atmosphere surrounding the weld pool, the fluorine-containing gas is configured to reduce diffusible hydrogen in the weld pool, and the fluorine-containing gas is substantially free of sulfur.

33 Claims, 3 Drawing Sheets

(56) References Cited

U.S. PATENT DOCUMENTS

| | | | |
|---|---|---|---|
| 3,805,016 A * | 4/1974 | Soejima et al. | 219/146.52 |
| 3,935,421 A * | 1/1976 | Ballass et al. | 219/146.3 |
| 3,939,323 A * | 2/1976 | Meehan et al. | 219/121.64 |
| 4,366,364 A | 12/1982 | Arai et al. | |
| 4,422,991 A * | 12/1983 | Phillips | 264/83 |
| 4,465,921 A | 8/1984 | Sakai et al. | |
| 4,482,798 A | 11/1984 | Hurlebaus | |
| 4,566,916 A | 1/1986 | Nagano et al. | |
| 4,723,060 A | 2/1988 | Arnoldy | |
| 4,764,224 A * | 8/1988 | Okuda | B23K 35/362 148/26 |
| 4,825,038 A | 4/1989 | Smartt | |
| 5,030,817 A | 7/1991 | Varenchuk | |
| 5,055,655 A | 10/1991 | Chai et al. | |
| 5,118,119 A | 6/1992 | Ditlinger | |
| 5,192,851 A | 3/1993 | James et al. | |
| 5,225,661 A | 7/1993 | Chai et al. | |
| 5,244,144 A | 9/1993 | Osame et al. | |
| 5,369,244 A | 11/1994 | Kulikowski et al. | |
| 5,945,014 A * | 8/1999 | Crockett et al. | 219/137 PS |
| 6,399,912 B1 | 6/2002 | Steenis | |
| 6,476,356 B2 | 11/2002 | Kim | |
| 6,521,867 B2 | 2/2003 | Bonnet et al. | |
| 6,713,723 B2 | 3/2004 | Lee | |
| 6,723,954 B2 | 4/2004 | Nikodym | |
| 6,723,957 B2 | 4/2004 | Holverson | |
| 6,915,964 B2 * | 7/2005 | Tapphorn | B05B 7/144 239/128 |
| 7,087,860 B2 | 8/2006 | Nikodym | |
| 7,172,070 B2 | 2/2007 | Coon et al. | |
| 7,335,852 B2 | 2/2008 | Holverson | |
| 7,510,664 B2 * | 3/2009 | Carr | 216/24 |
| 7,727,339 B2 | 6/2010 | Kapoor et al. | |
| 7,829,820 B2 | 11/2010 | Karogal et al. | |
| 7,985,940 B2 | 7/2011 | Albrecht | |
| 8,129,652 B2 * | 3/2012 | Hampton | 219/74 |
| 2003/0116550 A1 | 6/2003 | Lee | |
| 2003/0186109 A1 * | 10/2003 | Huang et al. | 429/44 |
| 2006/0096966 A1 * | 5/2006 | Munz | B23K 35/0266 219/145.22 |
| 2006/0144836 A1 | 7/2006 | Karogal et al. | |
| 2006/0219684 A1 | 10/2006 | Katiyar | |
| 2006/0219685 A1 * | 10/2006 | Karogal et al. | 219/145.22 |
| 2006/0226138 A1 | 10/2006 | James et al. | |
| 2006/0243717 A1 | 11/2006 | Holverson | |
| 2006/0261053 A1 | 11/2006 | Karogal | |
| 2007/0056945 A1 | 3/2007 | Hammen | |
| 2008/0090154 A1 * | 4/2008 | Ihara et al. | 429/338 |
| 2008/0149513 A1 | 6/2008 | Rolfes | |
| 2008/0149600 A1 | 6/2008 | Holverson | |
| 2008/0199753 A1 * | 8/2008 | Fuller et al. | 429/33 |
| 2008/0272100 A1 | 11/2008 | Amata | |

FOREIGN PATENT DOCUMENTS

| | | |
|---|---|---|
| CN | 1528552 | 9/2004 |
| CN | 1814396 | 8/2006 |
| CN | 2818045 | 9/2006 |
| CN | 101417365 | 4/2009 |
| CN | 101422839 | 5/2009 |
| CN | 102126089 | 7/2011 |
| EP | 0278330 A1 | 8/1988 |
| EP | 1570938 | 9/2005 |
| EP | 1764179 | 3/2007 |
| GB | 678081 | 8/1952 |
| GB | 1183463 | 3/1970 |
| GB | 1460140 | 12/1976 |
| JP | 48059041 | 8/1973 |
| JP | 57072795 | 7/1982 |
| JP | 59007495 | 1/1984 |
| JP | 61232097 | 10/1986 |
| JP | 62166098 | 7/1987 |
| JP | 5265736 | 10/1993 |
| JP | 2011088180 | 5/2011 |
| SU | 1109299 A1 | 8/1984 |
| WO | 2007030720 | 3/2007 |
| WO | 2011127072 | 10/2011 |

OTHER PUBLICATIONS

International Search Report from PCT application No. PCT/US2013/033681 dated Jul. 18, 2013, 12 pgs.

International Search Report from PCT application No. PCT/US2013/033674 dated Jul. 18, 2013, 13 pgs.

International Search Report from PCT application No. PCT/US2011/031278 dated Jul. 1, 2011, 4 pgs.

Olsen, F. O.; "Hybrid Laser-Arc Welding," Woodhead Publishing Series in Welding and Other Joining Technologies, Elsevier, 2009, p. 62.

* cited by examiner

SYSTEM AND METHOD OF REDUCING DIFFUSIBLE HYDROGEN IN WELD METAL

CROSS REFERENCE TO RELATED APPLICATION

This application claims the benefit of U.S. Provisional Patent Application No. 61/322,604, entitled "Method for Reducing Diffusible Hydrogen in Weld Metal", filed on Apr. 9, 2010, which is herein incorporated by reference in its entirety.

BACKGROUND

This disclosure relates generally to arc welding, and more specifically, to arc welding involving a shielding gas.

Welding is a process that has become ubiquitous in various industries for a variety of types of applications. For example, welding is often performed in applications such as shipbuilding, aircraft repair, construction, and so forth. Several welding techniques, such as Gas Metal Arc Welding (GMAW), Gas-shielded Flux Core Arc Welding (FCAW-G), and Gas Tungsten Arc Welding (GTAW), employ a shielding gas to provide a particular local atmosphere in and around the welding arc and the weld pool during welding. For example, commonly employed shielding gases include argon, carbon dioxide, helium, and oxygen. Shield gases and mixtures of shield gases may be selected to control, for example, arc stability, the formation of metal oxides, and the wettability of the metal surfaces.

For welding applications involving steel, one concern is the amount of diffusible hydrogen present in the weld during welding and after the welding process is complete. Hydrogen may be introduced into the weld from a number of sources, including moisture from the atmosphere, the metal surface, the welding electrode, or the shielding gas, and from oils, lubricants, or other coatings on the surface of the metal or welding wire during the welding operation. Hydrogen is readily soluble in steel exposed to high temperatures during the welding process; however, as the weld cools, the hydrogen may become increasingly insoluble in the steel and be rejected from solution. This may cause the hydrogen to collect at discontinuities and grain boundaries within the weld metal, resulting in localized regions of high pressure and strain within the weld. These regions of high pressure and strain can cause the weld to become brittle and crack, which may eventually lead to weld failure.

One method of limiting diffusible hydrogen in the weld is by preheating the metal, for example, to limit the amount of moisture present on the surface of the metal during the welding operation and/or provide better control of the metal microstructure by regulating the rate at which the metal cools. Such a preheat method may be common for situations involving the welding of thicker steel plates or high strength steels. However, fabricators can incur large costs (e.g., energy, equipment, time, etc.) associated with preheating steel to reduce the possibility of hydrogen cracking.

BRIEF DESCRIPTION

In one embodiment, a welding gas composition includes a shielding gas configured to control an atmosphere surrounding a weld pool, and a fluorine-containing gas configured to reduce diffusible hydrogen in the weld pool. Furthermore, the fluorine-containing gas is substantially free of sulfur.

In another embodiment, a method includes controlling a first gas flow of a fluorine-containing gas to a weld pool to reduce diffusible hydrogen in the weld pool, wherein the fluorine-containing gas is a carbon-based fluorine-containing gas.

In another embodiment, a welding system has a welding gas supply system configured to supply a gas flow including a shielding gas and a fluorine-containing gas to a weld pool. Furthermore, the shielding gas is configured to control an atmosphere surrounding the weld pool, the fluorine-containing gas is configured to reduce diffusible hydrogen in the weld pool, and the fluorine-containing gas is substantially free of sulfur.

DRAWINGS

These and other features, aspects, and advantages of the present invention will become better understood when the following detailed description is read with reference to the accompanying drawings in which like characters represent like parts throughout the drawings, wherein.

Figure 5:
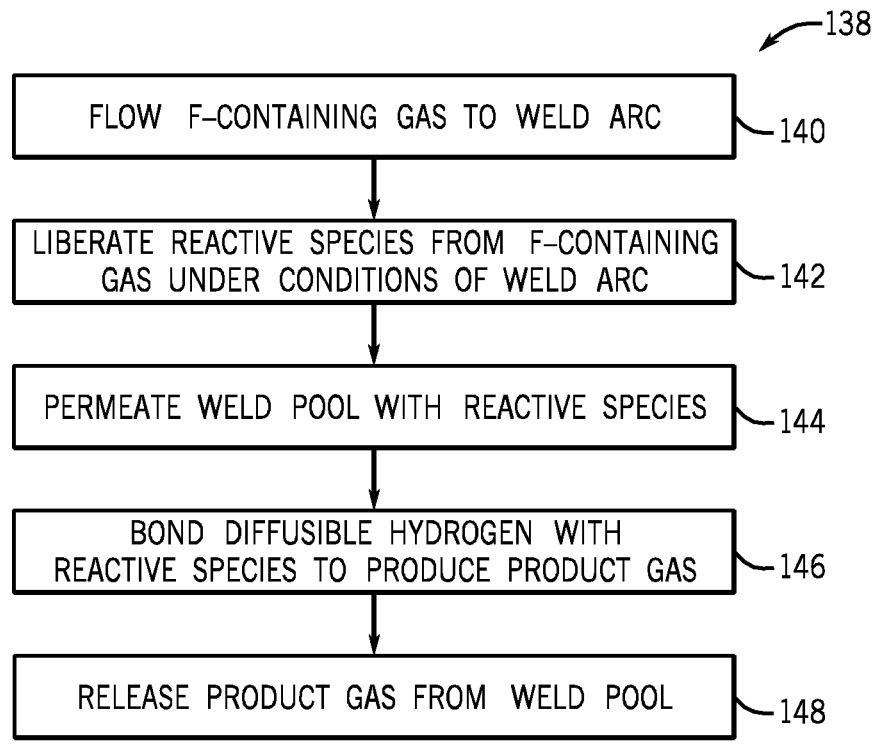
Figure 6:
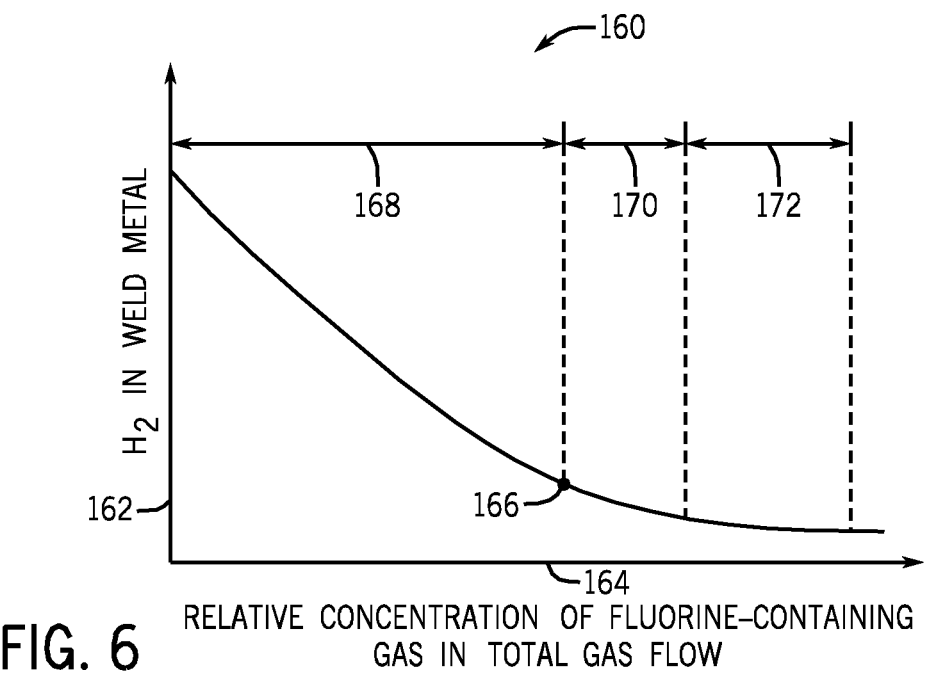

FIG. 5 is a flow diagram illustrating the steps that are believed to be involved in the removal of diffusible hydrogen from the weld metal using a fluorine-containing gas, in accordance with embodiments of the present disclosure; and FIG. 6 is a plot illustrating the general trend for the decreasing diffusible hydrogen in a weld as the concentration of the fluorine-containing gas relative to shielding gas concentration increases.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

As described in detail below, provided herein are embodiments of welding systems utilizing a fluorine-containing gas to reduce the amount of diffusible hydrogen in the weld metal. It should be appreciated that, while the present discussion may focus specifically on gas metal arc welding (GMAW), the inclusion of a fluorine-containing gas as discussed herein may benefit any arc welding process that seeks to minimize diffusible hydrogen in welds. As such, while the disclosed embodiments may be directed toward arc welding processes that involve a shielding gas, it should be appreciated that a fluorine-containing gas may be used to reduce diffusible hydrogen in the weld metal, as discussed herein, for other welding processes (e.g., submerged arc welding (SAW) and shielded metal arc welding (SMAW)) that do not typically use a shielding gas.

A fluorine-containing gas, as used herein, is a single gas, or a mixture of gases, that substantially possess at least one fluorine atom per gas molecule. For example, the fluorine-containing gas may be a carbon-based gas, such as carbon tetrafluoride ($CF_4$), perfluoroethane ($C_2F_6$), or chlorotrifluoromethane ($CF_3Cl$), or may be an inorganic gas, such as nitrogen trifluoride ($NF_3$), boron trifluoride ($BF_3$), silicon tetrafluoride ($SiF_4$), fluorine ($F_2$), tungsten hexafluoride ($WF_6$), or any mixtures thereof. A shielding gas, as used herein, refers to an inert or semi-inert shielding gas, e.g., argon (Ar), helium (He), carbon dioxide ($CO_2$), oxygen ($O_2$), nitrogen ($N_2$), etc., or any mixtures thereof. For example, a shielding gas may include Ar as well as Ar/$CO_2$ mixtures and Ar/$CO_2$/$O_2$ mixtures. Additionally, unless otherwise indicated, all references to gas mixture percentages are indicative of percent by volume.

In general, one embodiment of a gas supply system for the disclosed welding systems may employ a single gas source in which the shielding gas is premixed with the fluorine-containing gas. In another embodiment, a gas supply system may use multiple gas sources in which the shielding gas and the fluorine-containing gas are separately delivered to the welding torch to be mixed at or near the arc during welding. In another embodiment, a gas supply system may use multiple gas sources in which the shielding gas and the fluorine-containing gas are separately delivered to a premixing unit to be mixed together upstream of the welding torch.

In general, the disclosed embodiments afford a method of effectively reducing the amount of diffusible hydrogen in a weld in a more cost effective manner than other solutions, such as the preheating method described above. However, it should be appreciated that the disclosed embodiments may be used in combination with a preheating method to provide a combined effect on the diffusible hydrogen content in the weld, and may also reduce the amount (or degree) of preheating typically used for a given welding operation. It should also be noted that the presently disclosed embodiments employ a fluorine-containing gas rather than a fluorine-containing solid. Fluorine-containing gases offer advantages to the weld operator, such as greater flexibility in the selection of welding wire and reduced splatter during the welding operation.

Figure 1:
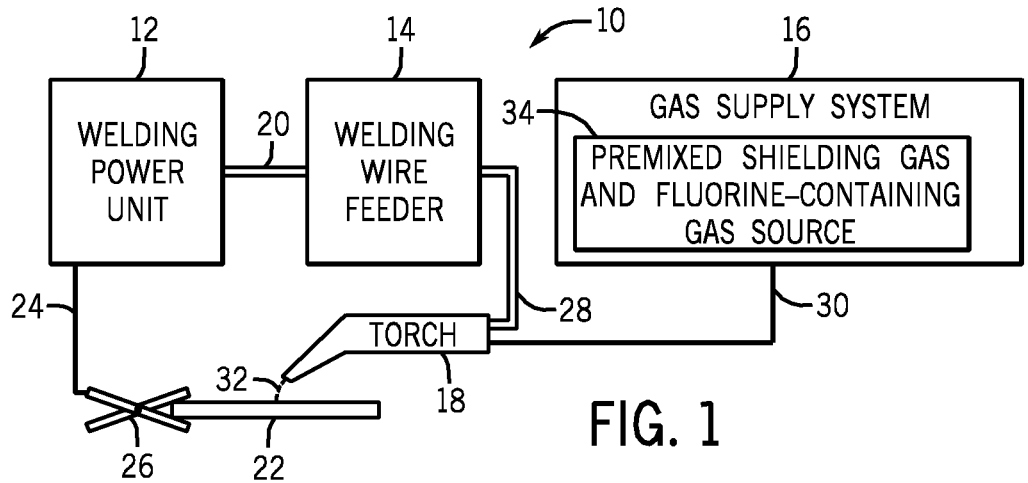
FIG. 1 is a block diagram of a welding system having a gas supply in which a shielding gas and a fluorine-containing gas are premixed, in accordance with embodiments of the present disclosure.

Turning to the figures, FIG. 1 illustrates an embodiment of a gas metal arc welding (GMAW) system 10 that may employ a fluorine-containing gas flow to reduce the diffusible hydrogen in welds, in accordance with the present disclosure. The system 10 includes a welding power unit 12, a welding wire feeder 14, a gas supply system 16, and a welding torch 18. The welding power unit 12 supplies power to the welding system 10 and may be coupled to the welding wire feeder 14 via cable bundle 20 as well as coupled to a workpiece 22 using a lead cable 24 having a clamp 26. In the illustrated embodiment, the welding wire feeder 14 is coupled to the welding torch 18 via a cable bundle 28 in order to supply welding wire and power to the welding torch 18 during operation of welding system 10. In another embodiment, the welding power unit 12 may couple and directly supply power to the welding torch 18.

In the depicted embodiment, the welding system 10 includes a gas supply system 16 that supplies a premixed flow of shielding and fluorine-containing gases to the welding torch 18. In the depicted embodiment, the gas supply system 16 is directly coupled to the welding torch 18 via the gas conduit 30. In another embodiment, the gas supply system 16 may instead be coupled to the wire feeder 14, and the wire feeder 14 may regulate the flow of gas from the gas supply system 16 to the welding torch 18. The illustrated welding torch 18 receives wire and power from the welding wire unit 14 and a premixed flow of gas from the gas supply system 16. During operation, the welding torch 18 may be brought near the workpiece 22 so that an arc 32 may be formed between the welding torch 18 and the workpiece 22.

The gas supply system 16 of the illustrated welding system 10 includes a premixed gas source 34 in which the shielding gas and the fluorine-containing gas may, for example, be stored in a single gas cylinder. For example, the gas supply system 16 may include a single gas cylinder containing approximately 95% shielding gas and approximately 5% fluorine-containing gas. More specifically, the gas cylinder may contain a mixture of approximately 70% Ar, 25% $CO_2$, and 5% $CF_4$. In another example, the premixed gas source 32 may contain a mixture of approximately 73.5% Ar, 24.5% $CO_2$, and 2% $SiF_4$. The shielding gas may be any of Ar, He, $CO_2$, $O_2$, $N_2$, or any mixture thereof. The fluorine-containing gas may be any of $C_mF_nX_p$, $NF_3$, $BF_3$, $SiF_4$, $F_2$, or $WF_6$, or any mixture thereof. For $C_mF_nX_p$, X may be a hydrogen or chlorine atom, m may be any value between 1 and 5, n may be any value between 1 and 18, and p may be any value between 0 and 18. For example, the fluorine-containing gas may be any of $CF_4$, $CF_3Cl$, $CF_2H_2$, $CFCl_3$, $C_2F_6$, $C_2F_4$, $C_2F_5Cl$, $C_2F_4H_2$, $C_3F_7H$, $C_4F_{10}$, etc., or any mixture thereof. The percentage of fluorine-containing gas in the total gas flow may be any value between approximately 0.1% and 10% (e.g., 0.2%, 0.75%, 1%, 1.5%, 2%, 2.5%, 3%, 4%, 4.5%, 5.5%, 6%, 7%, 8%, 9%, 10%, etc.). In an embodiment, the percentage of fluorine-containing gas in the total gas flow supplied to the welding torch 18 is between approximately 0.5% and 5%. In an embodiment, the percentage of fluorine-containing gas in the total gas flow is less than approximately 1%, 2%, 3%, 4%, or 5%.

By controlling the relative amount of atomic carbon, hydrogen, fluorine, and chlorine present in the fluorine-containing gas, as well as controlling the shielding/fluorine-containing gas mixture supplied to the torch, the parameters of the welding operation may be tuned. For example, when welding metals that are especially sensitive to the presence of diffusible hydrogen, higher relative concentrations of the fluorine-containing gas (e.g., between 5%10% of the total gas flow) may be used to maximize diffusible hydrogen scavenging. For example, when using a carbon-based fluorine-containing gas, utilizing gases with a higher number of carbons (i.e., larger m values) may contribute a greater amount of carbon to the resulting weld, which may be desirable for certain steel applications, while still reducing the amount of diffusible hydrogen. By further example, when using carbon-based fluorine-containing gases, using gases having some hydrogen (i.e., X is a hydrogen atom and p is greater than 0) may provide benefits to the arc similar to including hydrogen in the shielding gas, such as increasing arc temperature and arc penetration into the workpiece, while still limiting the amount of hydrogen that may be contributed to the weld metal during the welding operation.

However, not all fluorine-containing gases are compatible with applications involving particular metals. For example, while sulfur hexafluoride ($SF_6$) may be used as an additive to the shield gas to reduce the amount of diffusible hydrogen present in a weld, some materials (e.g., steel) are not compatible with $SF_6$ since the amount of sulfur (e.g., iron sulfide) remaining in the weld after the welding process may cause cracking due to sulfur segregation during weld solidification. As such, the fluorine-containing gas of the presently disclosed embodiments is substantially free of sulfur.

Figure 2:
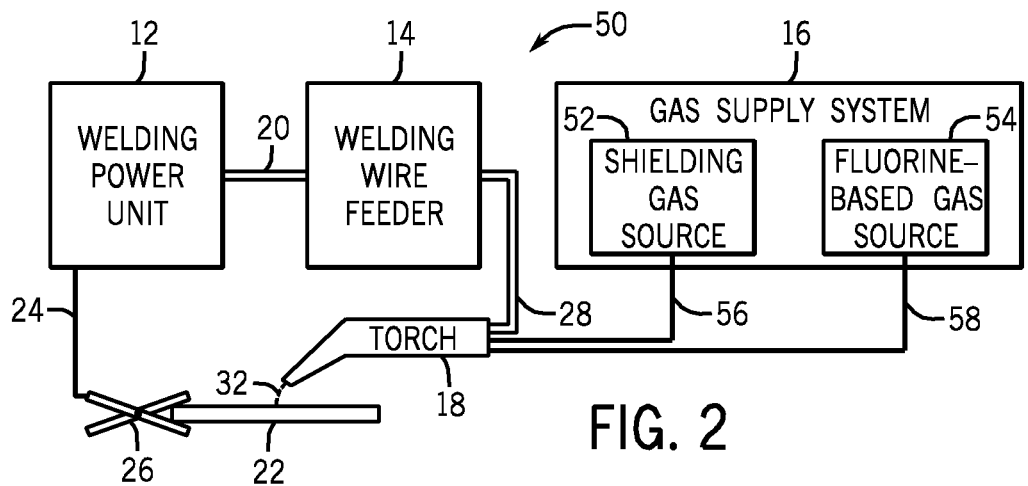
FIG. 2 is a block diagram of a welding system having a gas supply for separately supplying a shielding gas and a fluorine-containing gas to the welding torch, in accordance with embodiments of the present disclosure.

For some implementations, it may be desirable for the gas supply system 16 to deliver the shielding gas and the fluorine-containing gas from separate gas sources. For example, a shielding gas containing $O_2$ or $CO_2$ may potentially react with the fluorine-containing gas if stored together under certain conditions, which may alter the chemistry enough to diminish the effectiveness of the gas mixture for shielding and/or diffusible hydrogen scavenging purposes. With this in mind, FIG. 2 illustrates another embodiment of a GMAW system 50 that may employ a fluorine-containing gas flow to reduce the diffusible hydrogen in welds. Like the embodiment illustrated in FIG. 1, the embodiment of the welding system 50 includes a welding power unit 12, a welding wire feeder 14, and a welding torch 18 coupled to one another as previously presented.

In the illustrated embodiment, the GMAW system 50 also includes gas supply system 16 having a shielding gas source 52 and fluorine-containing gas source 54 (e.g., gas cylinders) separately containing and delivering each gas to the welding torch 18 via separate gas conduits 56 and 58. In an embodiment, the welding torch 18 may contain a premixing portion, so as to mix the shielding and fluorine-containing gas flows prior to exiting the welding torch 18. In another embodiment, the shielding gas and the fluorine-containing gas may remain separated (i.e., traverse separate gas conduits within the welding torch 18) until combined near the arc 32, so that the relative concentration of shielding gas and the fluorine-containing gas in different parts (e.g., the center portion versus the outer portion) of the gas mixture exiting the welding torch 18 may be controlled. For example, the gas stream exiting the welding torch 18 at the arc 34 may have a central fluorine-containing gas flow that is substantially surrounded by the shielding gas flow, or vice versa.

In the embodiment of FIG. 2, the shielding gas source may contain any of Ar, He, $CO_2$, $O_2$, $N_2$, or any mixture thereof. For example, the shielding gas source may contain 100% Ar, an approximately 75% Ar/25% $CO_2$ mixture, an approximately 75% Ar/23% $CO_2$/2% $O_2$ mixture, an approximately 95% Ar/5% $O_2$ mixture, 100% $CO_2$, and so forth. The fluorine-containing gas source may contain any of $C_mF_nX_p$, $NF_3$, $BF_3$, $SiF_4$, $F_2$, or $WF_6$, or any mixture thereof. For $C_mF_nX_p$, X may be a hydrogen or chlorine atom, m may be any value between 1 and 5, n may be any value between 1 and 18, and p may be any value between 0 and 18. For example, the fluorine-containing gas may be any of $CF_4$, $CF_2Cl_2$, $CF_3Cl$, $CF_3H$, $C_2F_4Cl_2$, $C_2F_2Cl_2$, $C_2F_5H$, $C_2F_4H_2$, $C_3F_7Cl$, $C_4F_8H_2$, etc., or any mixture thereof. Or, for example, the fluorine-containing gas may contain an approximately 98% $CF_4$/2% $F_2$ mixture, an approximately 90% $CF_3Cl$/10% $NF_3$ mixture, an approximately 80% $C_2F_4$/10% $CF_4$/10% $CF_3Cl$ mixture, etc. In an embodiment, the percentage of fluorine-containing gas in the total gas flow supplied to the welding torch 18 is between approximately 0.5% and 5%. In an embodiment, the percentage of fluorine-containing gas in the total gas flow is less than approximately 1%, 2%, 3%, 4%, or 5%.

Figure 3:
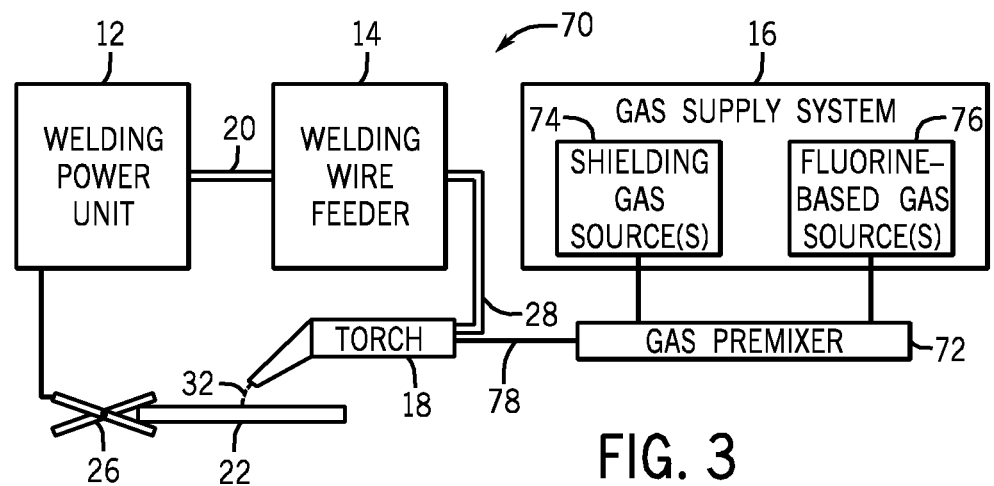
FIG. 3 is a block diagram of a welding system having a gas supply for supplying and mixing a shielding gas and a fluorine-containing gas, in accordance with embodiments of the present disclosure.

For some implementations, it may be desirable have the shielding gas and the fluorine-containing gas delivered from separate gas sources to a gas premixing unit to provide greater control of the mixing process. With this in mind, FIG. 3 illustrates another embodiment of a GMAW system 70 that may employ a fluorine-containing gas flow to reduce the diffusible hydrogen in welds, in accordance with the present disclosure. Like the embodiments of FIGS. 1 and 2, the depicted GWAW system 70 embodiment includes a welding power unit 12, a welding wire feeder 14, and a welding torch 18 coupled to one another as previously presented. The GMAW system 70 also includes a gas supply 16 having multiple separate gas sources coupled to a gas premixer 72. That is, the gas premixer 72 may be coupled to one or more shielding gas sources 74 (e.g., gas cylinders) as well as one or more fluorine-containing gas sources 76 (e.g., gas cylinders). For example, the gas premixer 72 may receive gas flows from three shielding gas sources 74 (e.g., Ar, $O_2$, and $CO_2$) and two fluorine-containing gas sources 76 (e.g., $CF_4$ and $CF_2Cl_2$). The gas premixer 72 may control the relative ratios of each of the individual gases to produce a mixed gas flow, based upon user defined parameters, that is delivered to the welding torch 18 that may be delivered to the welding torch 18 via gas conduit 78. In an embodiment, the gas premixer 72 may be a stand-alone unit or may be contained within the welding wire feeder 14 or the welding torch 18. In one implementation, the welding torch 18 may contain one or more sensors that may monitor parameters of the welding operation and provide feedback to the gas premixer 72, so that adjustments to the relative concentrations of the individual gases may be adjusted during welding system 70 operation.

Figure 4:
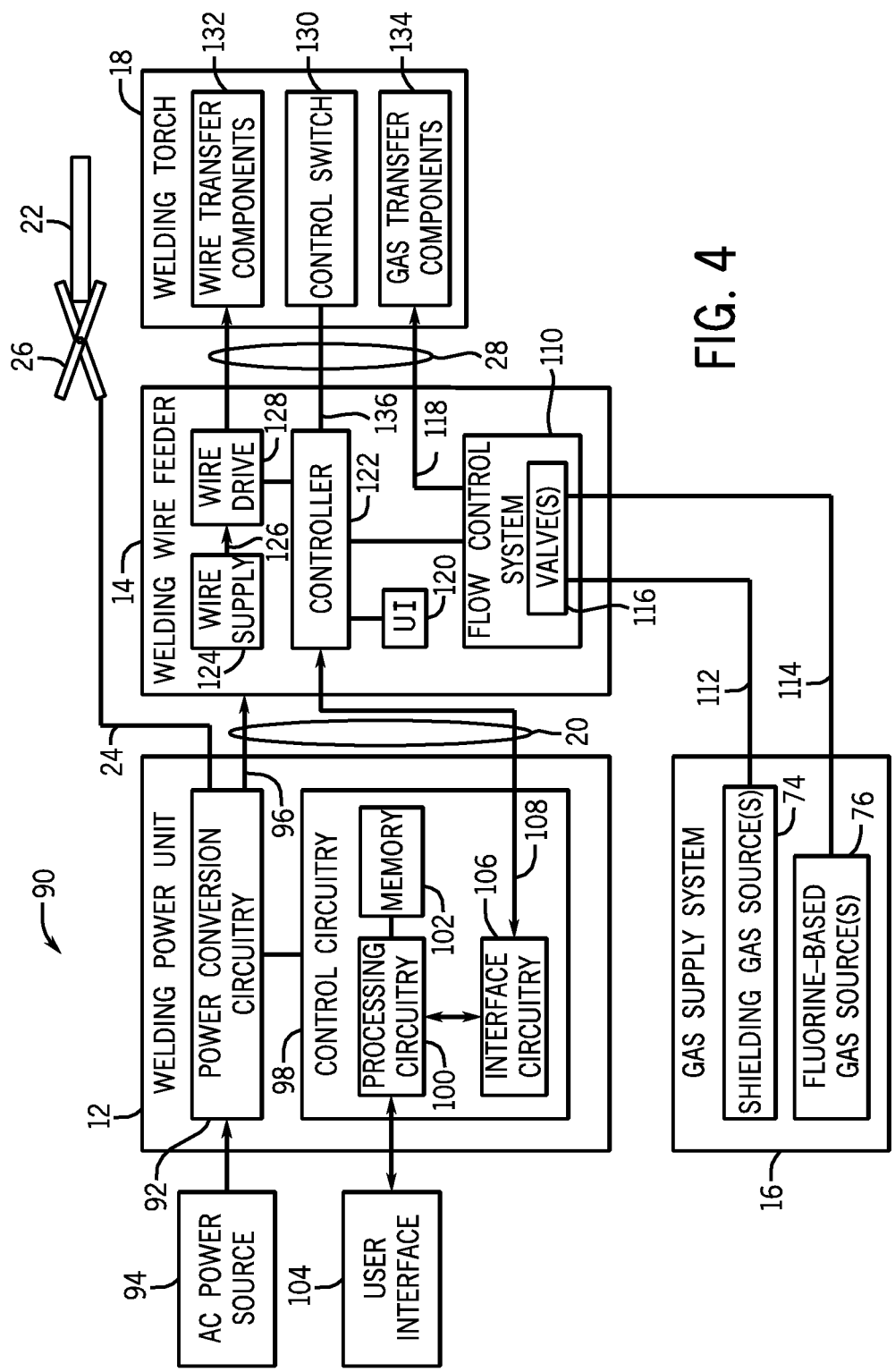
FIG. 4 is a block diagram demonstrating the internal circuitry of a welding system having a gas supply for supplying a shielding gas and a fluorine-containing gas, in accordance with embodiments of the present disclosure.

Turning to FIG. 4, a block diagram of another embodiment of a GMAW system 90 is presented. More specifically, FIG. 4 illustrates some of the internal components of a welding system 90 that may employ a fluorine-containing gas flow to reduce the diffusible hydrogen in welds, in accordance with the present disclosure. Similar to embodiments previously presented, the embodiment of FIG. 4 includes a welding power unit 12, a welding wire feeder 14, a welding torch 18, and a gas supply system 16. In the illustrated embodiment, the welding power unit 12 includes power conversion circuitry 92 that receives input power from an alternating current power source 94 (e.g., the AC power grid, an engine/generator set, or a combination thereof), conditions the input power, and provides output power via cable 96 to power the welding wire feeder 14 that, in turn, powers the a welding torch 18, in accordance with demands of the system 90. Accordingly, in some embodiments, the power conversion circuitry 92 may include circuit elements, such as transformers, rectifiers, switches, and so forth, capable of converting the AC input power to a direct current electrode positive (DCEP) or direct current electrode negative (DCEN) output, as dictated by the demands of the system 90. The lead cable 24 terminating in the clamp 26 couples the power conversion circuitry 92 to the workpiece 22 and closes the circuit between the welding power unit source 12, the workpiece 22, and the welding torch 18.

The weld power supply 12 also includes control circuitry 98 that is configured to receive and process a plurality of inputs regarding the performance and demands of the welding system 90. The control circuitry 98 includes processing circuitry 100 and memory 102. The memory 102 may include volatile or non-volatile memory, such as ROM, RAM, magnetic storage memory, optical storage memory, or a combination thereof. Furthermore, a variety of control parameters may be stored in the memory 102 along with code configured to provide a specific output (e.g., initiate wire feed, enable gas flow, etc.) during operation. The processing circuitry 100 may also receive one or more inputs from the user interface 104, through which the user may choose a process and input desired parameters (e.g., voltages, currents, particular pulsed or non-pulsed welding regimes, and so forth).

Based on such inputs received from the operator, the control circuitry 98 operates to control generation of welding power output that is applied to the welding wire for carrying out the desired welding operation, for example, via control signals transmitted to the power conversion circuitry 92. Based on such control commands, the power conversion circuitry 92 is adapted to create the output power that will ultimately be applied to the welding wire at the welding torch 18. To this end, as noted above, various power conversion circuits may be employed, including choppers, boost circuitry, buck circuitry, inverters, converters, and so forth. Still further, in the embodiment of FIG. 4, the control circuitry 98 also includes interface circuitry 106 configured to interface with the electronics of the wire feeder 14 during operation. The interface circuitry 106 is coupled to the processing circuitry 100 as well as to components of the wire feeder 14. Further, the processing circuitry 100 provides control signals associated with the weld operation to the wire feeder 14 via cable 108 coupled to the interface circuitry 106. As before, the welding power unit 12 and the welding wire feeder 14 are coupled to one another via the bundle 20 of cables, and the welding torch 18 is coupled to the wire feeder 14 via cable bundle 28.

In the illustrated embodiment, the gas supply system 16 is configured to supply shielding gas and fluorine-containing gas to a flow control system 110 located in the welding wire feeder 14. In the depicted embodiment, the gas supply system 16 individually delivers the gases to the flow control system 110 via one or more shielding gas conduits 112 (e.g., conduit bundle) and one or more of fluorine-containing gas conduits 114 (e.g., conduit bundle). In another embodiment, the gas supply system 16 may be coupled to a single premixed gas source system, like the embodiment of FIG. 1, and may couple to the flow control system via a single gas conduit. In the illustrated embodiment, the flow control system 110, like the premixer 72 in the embodiment of FIG. 3, may be coupled to multiple shielding gas sources 74 as well as multiple fluorine-containing gas sources 76. For example, the flow control system 110 may receive individual gas flows from two shielding gas sources 74 (e.g., Ar and $CO_2$) via different conduits in the shielding gas conduit bundle 112, and receive three fluorine-containing gas sources (e.g., $CF_4$, $CF_3Cl$, and $F_2$) via different conduits in the fluorine-containing gas conduit bundle 114, and provide a mixed gas flow from five separate gas sources. It should be appreciated embodiments may employ any number of gas conduits and gas sources. In another embodiment, the flow control system 110 may receive and regulate a gas flow from one or more shielding gas sources 74 and one or more fluorine-gas sources 76 and, rather than mix the gases together, output the gases individually (i.e., via different conduits) to the welding torch 18. Additionally, the flow control system 110 includes a plurality of valves 116, and may contain a plurality of regulators, gas flow sensors, and so forth, which regulate the flow of the incoming gas flows as well as the outgoing gas flow, which traverses gas conduit 118 to reach the welding torch 18.

More specifically, in the depicted embodiment, the shielding gas source 74 may contain any of Ar, He, $CO_2$, $O_2$, $N_2$, or any mixture thereof. For example, the shielding gas source 74 may contain 100% $CO_2$, an approximately 85% Ar/15% $CO_2$ mixture, an approximately 75% Ar/24% $CO_2$/1% $O_2$ mixture, an approximately 95% $CO_2$/5% $N_2$ mixture, 100% $CO_2$, etc. The fluorine-containing gas source 76 may contain any of $C_mF_nX_p$, $NF_3$, $BF_3$, $SiF_4$, $F_2$, or $WF_6$, or any mixture thereof. For $C_mF_nX_p$, X may be a hydrogen or chlorine atom, m may be any value between 1 and 5, n may be any value between 1 and 18, and p may be any value between 0 and 18. For example, the fluorine-containing gas may be any of $CF_4$, $CF_2Cl_2$, $CF_3Cl$, $CF_3H$, $C_2F_4H_2$, $C_2FCl_3$, $C_2F_4H_2$, $C_2F_6$, $C_3F_6Cl_2$, $C_4F_7H_3$, etc., or any mixture thereof. Or, for example, the fluorine-containing gas may contain an approximately 90% $CF_4$/2% $CF_2Cl_2$ mixture, an approximately 90% $CF_3H$/10% $BF_3$ mixture, an approximately 85% $C_2F_4$/13% $CF_4$/2% $WF_6$ mixture, etc. In an embodiment, the percentage of fluorine-containing gas in the total gas flow supplied to the welding torch 18 by the flow control system 110 is between approximately 0.5% and 5%. In an embodiment, the percentage of fluorine-containing gas in the total gas flow is less than approximately 1%, 2%, 3%, 4%, or 5%.

As illustrated in FIG. 4, in addition to the flow control system 110, the welding wire feeder 14 also includes the user interface 120 that allows for system parameters (e.g., wire feed speeds, processes, selected currents, voltages or power levels, relative shielding/fluorine-containing gas concentrations and flow rates, and so forth) to be set on the wire feeder 14. As such, the user interface 120 is coupled to the controller 122, which allows for wire feed speeds to be controlled in accordance with operator selections, and permits these settings to be fed back to the power supply 12 via the interface circuitry 106. The controller 122 also controls the flow control system 116 based on user defined settings and adjusts the relative ratios and flow rates of each of the individual gases to produce the desired mixed gas flow to be delivered to the welding torch 18 via the gas conduit 118. As mentioned above, in an embodiment, the flow control system 116 may deliver the shielding gas and the fluorine-containing gas separately via a plurality of gas conduits 118.

The welding wire feeder 14 also includes components for feeding wire to the welding torch 18 and thereby to the welding application, under the control of controller 122. For example, one or more wire supplies 124 (e.g., spools) of welding wire 126 are housed in the wire feeder 14. Wire feeder drive unit 128 may unspool welding wire 126 from the spools 124 and to progressively feed the welding wire 126 to the welding torch 18. To that end, the wire feeder drive unit 128 may include components such as circuitry, motors, rollers, and so forth, configured in a suitable way for establishing an appropriate wire feed. For example, in one embodiment, the wire drive unit 128 may include a feed motor that engages with feed rollers to push wire from the wire feeder 14 towards the welding torch 18. Power from the welding power unit 12 is applied to the fed wire, typically by the cable 96.

In the illustrated embodiment, the welding torch 18 may include a control switch 130, wire transfer components 132, and gas transfer components 134. During welding system operation, the wire may be advanced through the cable bundle 28 towards the welding torch 18. Within the torch 18, additional wire transfer components 132, such as an additional pull motor and an associated drive roller, may be provided. The pull motor may be regulated to provide the desired wire feed speed. Additionally, gas transfer components 134 (e.g., nozzles, control valves, gas diffusers, etc.) may be included in the welding torch 18 to control and direct the flow of the shielding/fluorine-containing gas mixture being received via the gas conduit 118. The welding torch may also include a control switch 130, coupled to the controller 122 in the welding wire feeder 14 via a control line 136, which may provide a signal the controller 122 to allow the welding process to be started and stopped by the operator. These start/stop signals may be propagated from the controller 122 to the flow control system 110 and the welding power unit 12. Accordingly, activating the control switch 130 may cause the shielding/fluorine-containing gas flow to begin, the wire to advance, and power to be applied to the advancing welding wire.

In another embodiment, the welding torch 18 may also include one or more sensors coupled to the controller 122 of the wire feeder 14. During operation, the sensors may be configured to measure one or more parameters from the welding torch 16 that are indicative the weld environment. To that end, the one or more sensors (e.g., thermal sensors, gas flow rate sensors, chemical sensors, optical sensors, etc.) may measure desired parameters continuously or at desired intervals throughout the weld operation. As the sensors acquire this data, it may be communicated to the controller 122 in the wire feeder 14 such that parameters of the welding system (e.g., shielding/fluorine-containing gas concentrations and flow rates, wire feed rates, arc voltage and current, etc.) may be adjusted by the controller 122 during system operation.

Once the fluorine-containing gas has been delivered to the welding torch 18, a series of events, depicted in the embodiment of FIG. 5, are believed to take place to remove the diffusible hydrogen from the weld. The first step of the process 138 of FIG. 5 is the introduction (block 140) of the fluorine-containing gas into the arc 32 at the contact tip of the welding torch 18. The conditions in and around the arc 32, namely the high voltage and high temperature environment, may then begin to break the chemical bonds in the fluorine-containing gas and liberate (block 142) a reactive species from the fluorine containing gas molecules. As used herein, the reactive species may be any residual radical (i.e., F., $CF_3$., Cl.) or ion (i.e., $CF_3^+$, $F^-$, $Cl^-$, etc.) produced from the fluorine-containing gas decomposition, or any combination thereof. Then, the liberated reactive species may permeate (block 144) the molten metal of the weld pool. In an embodiment, a portion of the fluorine-containing gas may enter the weld pool before the reactive species are liberated. Regardless of when it is liberated, the liberated reactive species in the weld pool bonds (block 146) with diffusible hydrogen that is dissolved in the weld pool, reacting with it to form a product gas (e.g., HF, HCl, $CF_3H$, etc.). Since the product gas may be less soluble in the molten metal than hydrogen, it may be released (block 148) from the molten weld pool before or as the weld is cooled, resulting in a weld having reduced diffusible hydrogen content. It should be noted that the liberated reactive species may also react with hydrogen present in the arc before reaching the weld pool, and thereby may also reduce the amount of hydrogen in the weld pool in a preventative manner.

It should be appreciated that the role of the fluorine atoms in the fluorine-based gas in the embodiment presented in FIG. 5 may be two-fold. First, the decomposition of the fluorine-based gas produces reactive species, such as $F^-$ and F., that may be well-suited for reacting with diffusible hydrogen in the deposition or making of the weld metal. However, the second, more subtle role of the fluorine atoms in the fluorine-based gas molecular structure is the electronic stabilization of other reactive species, such as $CF_3^+$, that may also be able to react with diffusible hydrogen in the weld.

To illustrate how the diffusible hydrogen content may be reduced using a fluorine-containing gas as discussed herein, FIG. 6 illustrates a plot 160 of diffusible hydrogen 162 versus relative concentration of the fluorine-containing gas in the total gas flow 164 delivered to the welding torch for an embodiment. In general, as illustrated in FIG. 6, as the relative concentration of the fluorine-containing gas increases, the amount of diffusible hydrogen in the weld metal decreases. After a certain relative concentration of fluorine-containing gas 166, further increasing the relative concentration of fluorine-containing gas may yield diminishing returns as the hydrogen concentration in the weld metal asymptotically approaches the axis (i.e. zero). For example, using a relative concentration of $CF_4$ between 0.1% and 5% may provide the most significant reduction to the diffusible hydrogen present, which may be represented by the portion 168 of the plot 160 having a first slope. However, relative concentrations of $CF_4$ between 5% and 10% may only afford a moderate decrease in the diffusible hydrogen present in the weld metal, which may be represented by the portion 170 of the plot 160 having a second slope that is less than the first slope. For relative concentrations of $CF_4$ greater than 10%, little to no change may be observed in the diffusible hydrogen in the weld metal, which may be represented by the portion 172 of the plot 160 having a third slope that is less than the second slope.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding gas mixture delivered to an arc welding system during an arc welding operation, wherein the welding gas mixture comprises:
   a shielding gas that provides an atmosphere surrounding a weld pool formed by the arc welding system during the arc welding operation; and
   a carbon-based fluorine-containing gas that reduces diffusible hydrogen in the weld pool, wherein the welding gas mixture comprises approximately 0.1 to approximately 10 percent by volume of the carbon-based fluorine-containing gas, and wherein the carbon-based fluorine-containing gas is substantially free of sulfur-containing gases.

2. The welding gas mixture of claim 1, wherein the welding gas mixture comprises less than approximately 5 percent by volume of the carbon-based fluorine-containing gas.

3. The welding gas mixture of claim 1, wherein the welding gas mixture comprises less than approximately 2 percent by volume of the carbon-based fluorine-containing gas.

4. The welding gas mixture of claim 1, wherein the carbon-based fluorine-containing gas comprises carbon tetrafluoride.

5. The welding gas mixture of claim 1, wherein the carbon-based fluorine-containing gas comprises any gas having the formula $C_mF_nX_p$, wherein X is a hydrogen or chlorine atom, m is any value between 1 and 5, n is any value between 1 and 18, and p is any value between 0 and 18.

6. The welding gas mixture of claim 1, wherein the shielding gas comprises argon, helium, carbon dioxide, oxygen, or a combination thereof.

7. The welding gas mixture of claim 1, wherein the welding gas mixture is disposed in a gas cylinder that is coupled to the arc welding system.

8. A method of performing an arc welding operation, comprising:
controlling a first gas flow of a fluorine-containing gas to an arc welding torch to reduce diffusible hydrogen in a weld pool formed during the arc welding operation, wherein the fluorine-containing gas is a carbon-based fluorine-containing gas; and
controlling a second gas flow of a shielding gas to the arc welding torch to control an atmosphere surrounding the weld pool during the arc welding operation.

9. The method of claim 8, wherein the carbon-based fluorine-containing gas comprises any gas having the formula $C_mF_nX_p$, wherein X is a hydrogen or chlorine atom, m is any value between 1 and 5, n is any value between 1 and 18, and p is any value between 0 and 18.

10. The method of claim 8, wherein the carbon-based fluorine-containing gas comprises carbon tetrafluoride.

11. The method of claim 8, comprising controlling a ratio between the first gas flow and the second gas flow.

12. The method of claim 8, wherein the weld pool is a submerged arc welding (SAW) weld pool and the arc welding torch is a SAW torch.

13. The method of claim 11, comprising mixing the first and second gas flows to produce a gas mixture upstream of the arc welding torch.

14. The method of claim 12, wherein controlling the first gas flow comprises providing the first gas flow to the weld pool from a contact tip of the SAW torch.

15. The method of claim 13, wherein the gas mixture comprises less than approximately 10 percent by volume fluorine-containing gas.

16. An arc welding system, comprising:
an arc welding torch that forms a weld pool during an arc welding operation;
an arc welding gas supply system that supplies a shielding gas flow and a fluorine-containing gas flow to the arc welding torch during the arc welding operation, wherein the shielding gas provides an atmosphere surrounding the weld pool, wherein the fluorine-containing gas reduces diffusible hydrogen in the weld pool, wherein the shielding gas flow is approximately ten times greater than the fluorine-containing gas flow, and wherein the fluorine-containing gas is substantially free of sulfur-containing gases.

17. The arc welding system of claim 16, wherein the fluorine-containing gas comprises carbon tetrafluoride.

18. The arc welding system of claim 16, wherein the arc welding gas supply system comprises a gas premixer that mixes the shielding gas flow with the fluorine-containing gas flow to form a welding gas mixture that is supplied to the arc welding torch of the arc welding system via a single conduit.

19. The arc welding system of claim 16, wherein the arc welding system comprises a submerged arc welding (SAW) system and the arc welding operation comprises a SAW operation.

20. The arc welding system of claim 16, wherein the arc welding torch comprises a first gas conduit that delivers the shielding gas flow to the weld pool and a second gas conduit that separately delivers the fluorine-containing gas flow to the weld pool.

21. The arc welding system of claim 16, wherein the arc welding torch comprises a gas premixer that mixes the shielding gas flow with the fluorine-containing gas flow to form a welding gas mixture that is delivered to the weld pool.

22. The arc welding system of claim 16, wherein the fluorine-containing gas consists essentially of carbon tetrafluoride.

23. The arc welding system of claim 16, wherein the fluorine-containing gas comprises any gas having the formula $C_mF_nX_p$, wherein X is a hydrogen or chlorine atom, m is any value between 1 and 5, n is any value between 1 and 18, and p is any value between 0 and 18.

24. The arc welding system of claim 16, wherein the shielding gas comprises argon, helium, carbon dioxide, oxygen, or a combination thereof.

25. The arc welding system of claim 16, wherein the shielding gas flow and the fluorine-containing gas flow are mixed within the arc welding torch form a welding gas mixture that comprises less than approximately 2 percent by volume of the fluorine-containing gas.

26. A method of performing an arc welding operation, comprising:
receiving a shielding gas at a gas premixer of an arc welding system;
receiving a fluorine-containing gas at the gas premixer, wherein the fluorine-containing gas is substantially free of sulfur-containing gases; and
mixing the shielding gas and the fluorine-containing gas using the gas premixer to generate a welding gas mixture; and
delivering the welding gas mixture to a weld pool from an arc welding torch during the arc welding operation, wherein the delivered welding gas mixture comprises less than approximately 10 percent by volume fluorine-containing gas.

27. The method of claim 26, wherein the fluorine-containing gas is a carbon-based fluorine-containing gas.

28. The method of claim 26, wherein the delivered welding gas mixture comprises less than approximately 2 percent by volume fluorine-containing gas.

29. The method of claim 26, wherein the fluorine-containing gas is nitrogen-based, silicon-based, tungsten-based, or a combination thereof.

30. The method of claim 26, wherein the gas premixer is disposed within the arc welding torch.

31. A gas cylinder that is coupled to an arc welding system and that contains a welding gas mixture comprising:
a shielding gas configured to provide an atmosphere surrounding a weld pool formed by the arc welding system during an arc welding operation; and
a fluorine-containing gas configured to reduce diffusible hydrogen in the weld pool, wherein the fluorine-containing gas is a carbon-based fluorine-containing gas that is substantially free of sulfur-containing gases.

32. The gas cylinder of claim 31, wherein the welding gas mixture comprises less than approximately 10 percent by volume fluorine-containing gas.

33. The gas cylinder of claim 31, wherein the gas cylinder is configured to provide the welding gas mixture to the arc welding system during the arc welding operation.

* * * * *